(12) United States Patent
Connor et al.

(10) Patent No.: US 11,767,133 B1
(45) Date of Patent: Sep. 26, 2023

(54) SPACECRAFT DEPLOYMENT SYSTEMS AND METHODS USING MOMENT BEARING SHEAR BALL

(71) Applicant: LOCKHEED MARTIN CORPORATION, Bethesda, MD (US)

(72) Inventors: Spencer Keith Connor, Littleton, CO (US); Joseph C. Munder, Morrison, CO (US); Jeffrey John Bank, Littleton, CO (US); Timothy ONeill, Longmont, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1,099 days.

(21) Appl. No.: 16/520,244

(22) Filed: Jul. 23, 2019

Related U.S. Application Data (60) Provisional application No. 62/828,965, filed on Apr. 3, 2019.

(51) Int. Cl.
*B64G 1/22* (2006.01)

(52) U.S. Cl.
CPC .................................. *B64G 1/222* (2013.01)

(58) Field of Classification Search
CPC ......... B64G 1/222; B64G 1/645; B64G 1/641; F16B 31/007; F16B 21/12; F16B 21/16; F16B 31/005; F16B 31/04; Y10T 403/10; Y10T 403/11
See application file for complete search history.

(56) References Cited

U.S. PATENT DOCUMENTS

| 5,248,233 | A  | * | 9/1993  | Webster ............... | F16B 1/0014  |
|           |    |   |         |                        | 102/377      |
| 5,695,306 | A  | * | 12/1997 | Nygren, Jr. ...........  | F15B 15/261  |
|           |    |   |         |                        | 411/433      |
| 7,001,127 | B2 | * | 2/2006  | Tuszynski .............  | B64G 1/645   |
|           |    |   |         |                        | 411/433      |
| 7,862,282 | B2 | * | 1/2011  | Smith et al. ..........  | F16B 31/005  |
|           |    |   |         |                        | 411/433      |
| 8,651,765 | B2 | * | 2/2014  | Plaza Baonza ........   | B64G 1/222   |
|           |    |   |         |                        | 403/322.3    |
| 10,480,898| B2 | * | 11/2019 | Kim et al. .............. | F41F 3/052   |

* cited by examiner

*Primary Examiner* — Medhat Badawi
*Assistant Examiner* — Vicente Rodriguez
(74) *Attorney, Agent, or Firm* — BAKERHOSTETLER (57) ABSTRACT

A deployment system for a spacecraft may include a fitting for coupling a deployable device to the spacecraft, and a moment bearing shear ball assembly. The moment bearing shear ball assembly may include a shear ball engaged within the fitting, and a moment collar mounted onto the shear ball. The moment collar may have a planar surface engaged with a planar surface of the fitting. A separation interface may be defined between at least one of (1) mating surfaces of the fitting and the shear ball and (2) mating surfaces of the fitting and the moment collar. Engagement of the shear ball within the fitting constrains shear forces in at least two axes and axial forces in at least a third axis. Engagement of the moment collar with the shear ball and the fitting constrains overturning moments of the shear ball about at least two axes, and axial forces in at least a third axis.

20 Claims, 5 Drawing Sheets

SPACECRAFT DEPLOYMENT SYSTEMS AND METHODS USING MOMENT BEARING SHEAR BALL

CROSS-REFERENCES TO RELATED APPLICATIONS

This application claims priority under 35 U.S.C. § 119 to Provisional Application No. 62/828,965 filed on Apr. 3, 2019, in the United States Patent and Trademark Office, the entire contents of which is incorporated herein by reference for all purposes.

STATEMENT REGARDING FEDERALLY SPONSORED RESEARCH OR DEVELOPMENT

Not Applicable.

TECHNICAL FIELD

The present description relates in general to spacecraft deployment systems and methods, and in particular to, for example, without limitation, a spacecraft deployment system and method utilizing a single separation interface that is capable of resisting shear and axial moments.

BACKGROUND

The description provided in the background section should not be assumed to be prior art merely because it is mentioned in or associated with the background section. The background section may include information that describes one or more aspects of the subject technology.

Current tolerance capability of manufacturing methods and techniques for producing components of spacecraft deployment systems cannot achieve continuous contact of all desired load carrying contact surfaces in a single separation interface. Because continuous contact of all desired load carrying contact surfaces cannot be achieved for components of currently existing spacecraft deployment systems at a single separation interface, loads are transferred from the joint at the separation interface of the components of spacecraft deployment systems to the generally more fragile separation device when the joint slips under flight loads. This can disadvantageously lead to premature failure at the separation device, and corresponding premature deployment of the deployable device from the spacecraft. Current separation interfaces of spacecraft deployment systems for small scale satellite applications are only each capable of restraining three out of the six degrees of freedom (DoF).

For other spacecraft deployment applications where it is necessary to restrain the deployable devices, in order to overcome the aforementioned issues, current release mechanisms for spacecraft deployment systems utilize multiple (e.g., three or more separation interfaces which each are each again capable of restraining three degrees of freedom, but combined are capable of restraining the deployable device in multiple (e.g., all six) degrees of freedom (DoF). However, this approach is not suitable for small scale satellite applications where size and weight is limited, and thus is only appropriate or applicable to relatively large deployment assemblies. Further, the aforementioned configuration with multiple separation interfaces causes over-constraining of the joints at each separation interface, which is further disadvantageous. The aforementioned configuration with multiple separation interfaces is more expensive, complex and heavy due to additional parts and weight associated with the multiple separation interfaces, which is further disadvantageous.

SUMMARY

One or more implementations of the present disclosure provide a deployment system for a spacecraft, including a fitting for coupling a deployable device to the spacecraft, and a moment bearing shear ball assembly. The fitting may include an inner mating surface and a planar outer mating surface. The moment bearing shear ball assembly may include a shear ball having an outer circumferential mating surface, and a moment collar with a planar mating surface mounted onto the shear ball. The shear ball outer circumferential mating surface of the shear ball may be engaged with the inner mating surface of the fitting, and the moment collar planar mating surface may engage with the planar outer mating surface of the fitting. A separation interface may be defined between at least one of (1) the mating surfaces of the fitting and the shear ball and (2) the mating surfaces of the fitting and the moment collar. Engagement of the outer circumferential surface of the shear ball within the inner mating surface of the fitting constrains translation shear forces in at least two axes and axial forces in at least a third axis at the separation interface. Engagement of the planar mating surface of the moment collar with the planar outer mating surface of the fitting constrains overturning moments of the shear ball about the at least two axes and axial forces in at least the third axis at the separation interface.

One or more implementations of the present disclosure provide a method of assembling a moment bearing deployment system for a spacecraft. The deployment system may include a shear ball having a cylindrical body, a moment collar, a fitting for a deployable device of the spacecraft, and a separation interface defined between mating surfaces of the moment bearing shear ball and moment collar and the fitting. The method may include preloading the shear ball against the fitting to prevent motion of the shear ball in at least two axes at the separation interface, sliding the moment collar over the shear ball and engaging an outer cylindrical surface of the shear ball with an inner surface of the moment collar, and engaging a planar surface of the moment collar with a corresponding planar surface of the fitting. The ball-and-socket joint may be configured to prevent motion of the moment bearing shear ball in at least two axes. The engaging of the moment collar with the outer surface of the shear ball and the planar surface of the fitting may prevent rotation of the moment bearing shear ball assembly about the at least two axes, and translation of the shear ball in a third axis.

The description in this summary section may provide some illustrative examples of the disclosure. This section is not intended to be a broad overview or to identify essential elements of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

It would be advantageous to have a mechanism for adequately constraining the loads (tensile, shear and moments) through a single separation interface which can be applied to smaller scale satellite applications without over-constraining the joint at the separation interface.

The present description relates in general to a precision matched separation interface of a spacecraft deployment system that is capable of resisting shear and axial moments, and more particularly, for example, without limitation, to a precision matched separation interface including a moment bearing shear ball assembly that is capable of resisting shear forces and axial moments, and overturning moments, and that can provide repeatable alignment exceeding that achievable through normal machined parts.

Figure 1:
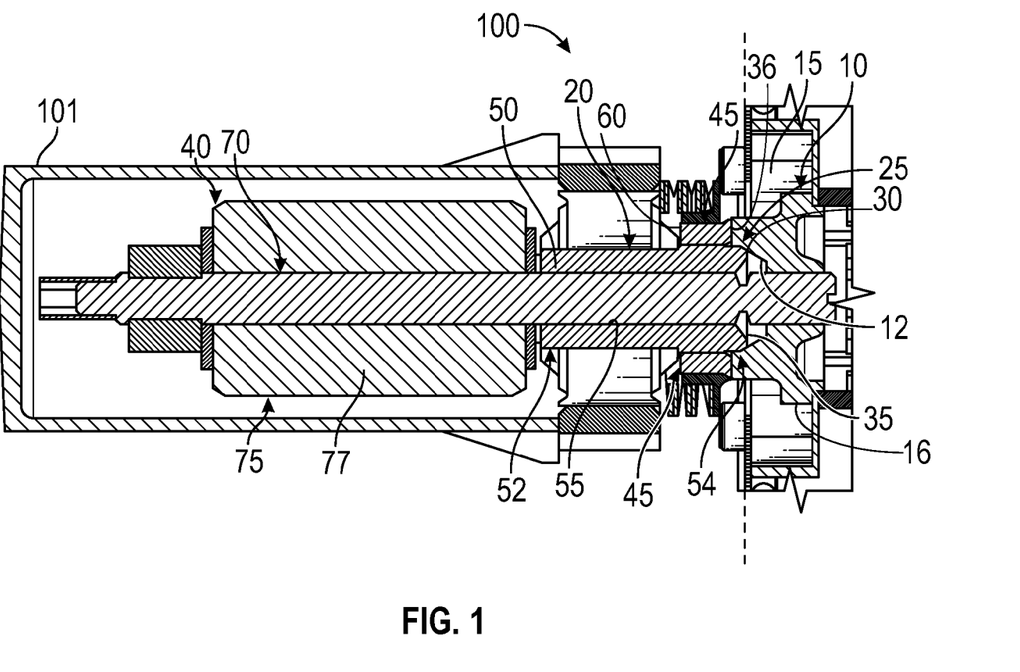
FIG. 1 illustrates a cross-sectional view of a spacecraft deployment system according to various embodiments of the present disclosure.

FIG. 1 illustrates a cross-sectional view of a spacecraft deployment system 100 according to various embodiments of the present disclosure. The spacecraft deployment system 100 may include a moment bearing shear ball assembly 25 having (1) a shear ball 20 coupled to a fitting 10 of a deployable device 15 at a portion 35 of a separation interface 35, 36 and (2) a moment collar coupled to the fitting 10 of the deployable device 15 at portion 36 of separation interface 35, 36. The separation interface is herein defined as the interface of the components of the spacecraft deployment system 100 where separation takes place once the deployable device 15 is released from the remainder of the spacecraft 101. For example, the separation interface may include the portion 35 defined between the spherical ball 30 and the conical profile 12 of mating surface 13 of the fitting 10, and the portion 36 defined between the respective mating surfaces 11 and 51 of the fitting 10 and the moment collar 45 (illustrated in FIG. 3B). As depicted, the spacecraft deployment system 100 may further include a command and release mechanism 75 in the form of a mechanical actuator 40 (e.g., a Frangibolt actuator) coupled to the moment bearing shear ball assembly 25 through a fastener, e.g. a notched bolt 70. As depicted, the moment bearing shear ball assembly 25 holds the deployable device 15 to the rest of the spacecraft 101 through the fitting 10 until it is time for the deployable device 15 to be deployed or otherwise released from the spacecraft 101.

As shall be discussed and illustrated in further detail below, the moment bearing shear ball assembly 25 of the various embodiments described herein holds the deployable device 15 to the spacecraft 101 in such a manner that the loads (tensile and shear forces, and overturning moments) are adequately constrained at portions 35 and 36 of the separation interface 35, 36. Accordingly, the loads in the joint of the moment bearing shear ball assembly 25 and deployable device fitting 10 at the separation interface 35, 36 are prevented from transferring to the separation device through slipping of the joint under flight loads, thereby reducing the possibility of premature release, (e.g., fracturing of the bolt 70) and deployment of the deployable device 15 during preload, vibe, or launch of the spacecraft 101. As shall be described in further detail below, the moment bearing shear ball assembly 25 of the various embodiments described herein thus advantageously holds or couples the deployable device 15 to the rest of the spacecraft 101 while restraining motion in 5 of the 6 degrees of freedom. As the aforementioned components may be reversed with no change in design, the side of the spacecraft deployment system 100 having the fitting 10 may be referred to as the deployable device 15 and the side having the moment bearing shear ball assembly 25 may be referred to as the spacecraft 101 regardless of the function of either the deployable device 15 or the spacecraft 101, which may be larger in size or mass, presence of other deployables on either, or any attribute outside of the spacecraft deployment system 100.

In accordance with some embodiments, the mechanical actuator 40 may be a sleeve 77 fitted around the notched bolt 70, and may be formed of, but not limited to, a shape memory alloy. Alternatively, any other spacecraft rated release mechanism (e.g. a separation nut, split-spool release device or a pyrotechnic release actuator) may be used with the described separation interface. When the actuator 40 receives a command to actuate from a controller of the spacecraft, the actuator 40 may release the preload (e.g. fracture the fastener, release a rod or cut a cable). Releasing the preload leads to separation of the moment bearing shear ball assembly 25 from the deployable device fitting 10, and ultimate separation of the deployable device 15 from the spacecraft 101.

In accordance with some embodiments, as depicted in FIG. 1, and as shall be described in further detail with respect to subsequent Figures, the moment bearing shear ball assembly 25 includes a shear ball 20 and a moment collar 45. The shear ball 20 may include a cylindrical body 50, a spherical ball 30 located at an end of the cylindrical body 50, a bore 55 extending axially through the cylindrical body 50, and a raised seating portion 60 extending concentrically from an outer surface of the cylindrical body 50. As depicted, the moment collar 45 may be a cylindrical body or sleeve configured to fit around and engage the cylindrical body 50 at the raised seating portion 60. In accordance with some embodiments, the fitting 10 may include a bore 18 (illustrated in FIGS. 2A and 2B), and a plurality of anchoring legs 16 for coupling the fitting 10 to the deployable device 15.

The moment bearing shear ball assembly 25 and separation interface 35, 36 of the various embodiments described herein is advantageous over release mechanisms applied at separation interfaces of the currently existing or conventional deployment systems (which are described briefly below) as it provides a precision matched interface that is capable of resisting shear forces, axial forces, and overturning moments. The moment bearing shear ball assembly 25 and separation interface 35, 36 of the various embodiments described herein can be applied at a fraction of the scale of currently existing solutions, with fewer parts, lower mass, better manufacturability, and less alignment time. Additionally, as described above, the design of the moment bearing shear ball assembly 25 and separation interface 35, 36 of the various embodiments described herein avoids over-constraint of the degrees of freedom of the joint which drives cost through tight tolerancing. Further, the shear ball assembly 25 and separation interface 35, 36 of the various embodiments described above avoids additional concerns associated with thermal effects, jamming, and load sharing uncertainty.

Further, the manufacture and assembly process of the separation interface 35, 36 of the moment bearing shear ball assembly 25 and deployable device fitting 10 of the various embodiments described herein can provide repeatable alignment exceeding that achievable by machined parts produced using the current manufacturing tolerance capabilities of release mechanisms applied at separation interfaces of the currently existing or conventional spacecraft deployment systems. A moment bearing separation interface is generally driven by the sensitivity of the release actuator to joint slip under various flight loads, which produces high and unaccounted stress in the joint which can damage the actuator. Tolerances achieved by conventional machining are generally sufficiently loose to potentially induce unaccounted loads into the separation device, which would then cause failure at the actuator (e.g., the fastener), and premature deployment of the payload either during preload, vibe, or launch. Further, tolerances achieved by conventional machining are generally sufficiently loose to prevent proper mating of the interfaces.

Figure 2A:
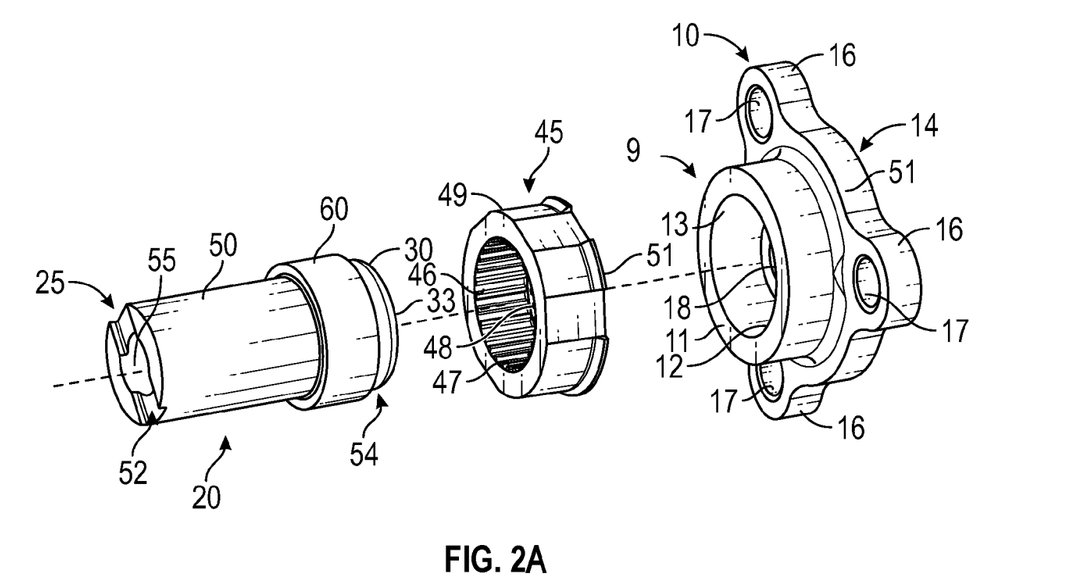
FIGS. 2A and 2B are exploded isometric views of launch-lock components of the spacecraft deployment system of FIG. 1, according to various embodiments of the present disclosure.
Figure 2B:
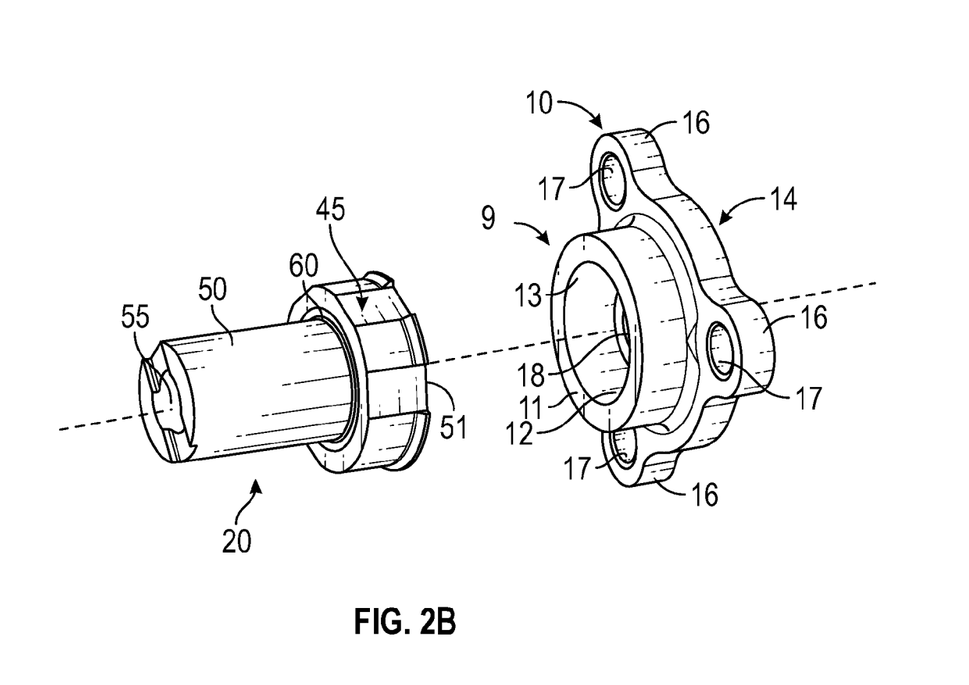

FIGS. 2A and 2B are exploded isometric views of launch-lock components of the spacecraft deployment system of FIG. 1, according to various embodiments of the present disclosure. As described above with respect to FIG. 1, the spacecraft deployment system may include a fitting 10 and a moment bearing shear ball assembly 25 including the shear ball 20 and the moment collar 45 mounted onto the shear ball 20.

According to various embodiments of the present disclosure, the fitting 10 may include an inner mating surface 13 and a planar outer mating surface 11. As depicted in FIG. 1, the inner mating surface 13 of the fitting may have a conical profile 12. In some embodiments, the conical profile may be formed at an angle ranging from about 40-80 degrees, in some instances ranging from about 45-75 degrees, more typically from about 50-70 degrees, specifically from about 55-65 degrees, and in some embodiments approximately 60 degrees. Though recited in terms of certain ranges, it will be understood that all ranges from the lowest of the lower limits to the highest of the upper limits are included, including all intermediate ranges or specific angles, within this full range or any specifically recited range. In yet other embodiments, the inner mating surface 13 of the fitting may have a spherical, ogive, or cylindrical profile instead of the aforementioned conical profile.

As depicted in FIG. 2A, the elongated cylindrical body 50 of the shear ball 20 may have a proximal end portion 52 and a distal end portion 54, and the outer circumferential surface 33 may be positioned at the distal end portion 54 of the shear ball 20 for engagement with the inner mating surface 13 of fitting 10. The shear ball 20 may further include a bore 55 extending axially through the cylindrical body 50. In some embodiments, the shear ball 20 may further include the raised seating portion 60 extending concentrically from an outer surface of the distal end portion 54 of the elongate cylindrical body 50.

In accordance with some embodiments, the moment collar 45 may include a cylindrical body 49 configured to fit around and engage the outer surface of the elongate cylindrical body 50 of the shear ball 20 at the raised seating portion 60. The cylindrical body 49 may have a planar mating surface 51 disposed at a distal end thereof for mating with the planar outer mating surface 11 of the fitting 10. The moment collar 45 may further include a plurality of threads 46 disposed on an inner circumferential surface 47 thereof to engage an outer surface of the raised seating portion 60 in an engaged configuration.

As further depicted in FIG. 2A, the fitting 10 may have a proximal end portion 9 from which the inner mating surface 13 extends, and a distal end portion 14. The distal end portion 14 may include a plurality of anchoring legs 16 for anchoring the fitting 10 to the deployable device 15. In particular, each of the anchoring legs 16 may include a through-hole 17 for insertion of a fastener to couple the fitting 10 to the deployable device 15. The fitting 10 may thus function in one aspect to couple the deployable device 15 to the rest of the spacecraft 101. The fitting 10 may further include a bore 18 extending axially through the fitting from the proximal to the distal end portion. The profile 12 of the inner mating surface 13 may define the shape of the bore 18 from the proximal end portion 9 to the distal end portion 14 of the fitting 10.

Figure 2C:
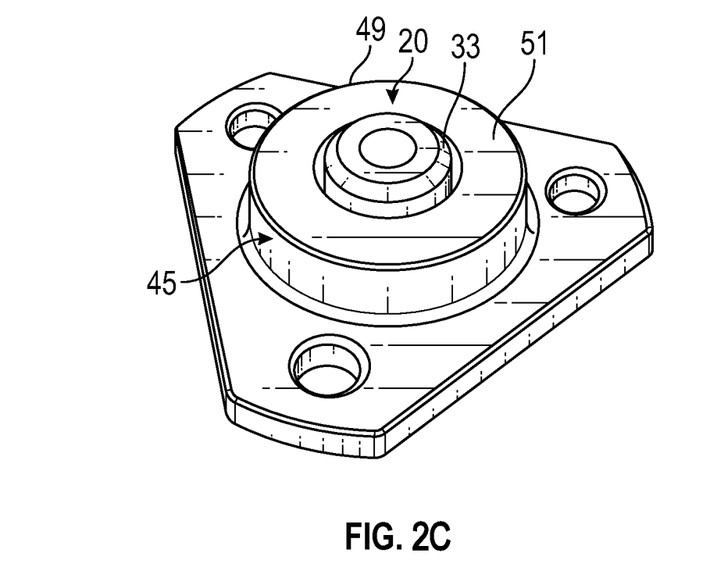
FIG. 2C illustrates a perspective view of an assembly of a moment bearing shear ball assembly of a spacecraft deployment system, according to various embodiments of the present disclosure.
Figure 2D:
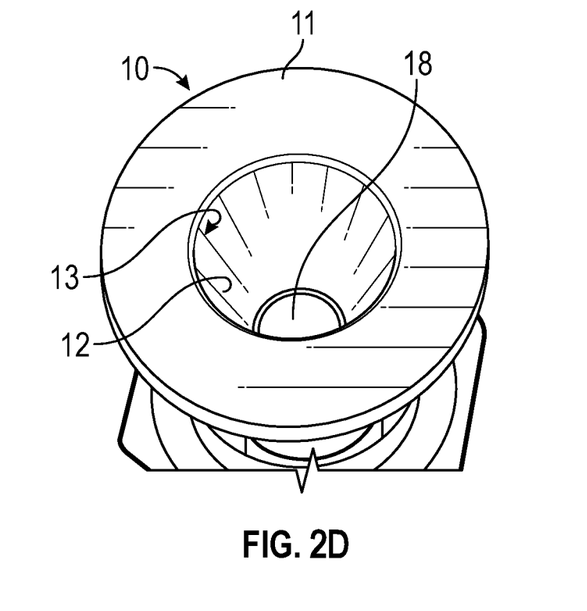
FIG. 2D illustrates a perspective view of the fitting with conical inner mating profile, according to various embodiments of the present disclosure.

FIG. 2C illustrates a perspective view of an assembly of the moment bearing shear ball assembly 25 of a spacecraft deployment system, according to various embodiments of the present disclosure. FIG. 2D illustrates a perspective view of the fitting 10 with conical profile 12, according to various embodiments of the present disclosure.

In accordance with some embodiments, as illustrated in FIG. 2C, the shear ball 20 has a corresponding outer circumferential surface 33 that when assembled with the fitting 10 may be engaged within the conical profile 12 of the inner mating surface 13 of the fitting 10 illustrated in FIG. 2D. For example, in some embodiments, the outer circumferential surface 33 of the shear ball 20 may be a spherical outer surface. During assembly of the spacecraft deployment system, the spherical outer surface 33 may be inserted to engage the conical profile 12 of the inner mating surface 13. When engaged, as shall be illustrated in FIGS. 3A and 3B, the spherical outer circumferential surface 33 of the shear ball 20 and the conical inner surface form a ball-and-socket joint which prevents motion due to shear forces at the separation interface in at least two (more specifically three) axes, as shall be described in further detail below. Further, as assembled, the planar mating surface 51 of the moment collar 45 mated and engaged with the raised seating portion 60 of the shear ball 20 and the planar outer mating surface 11 of the fitting 10 additionally constrains (1) overturning moments of the shear ball 20 about the at least two axes, and (2) axial forces in at least a third axis (i.e., an axis C (illustrated in FIG. 3B) extending through an axial center of the moment bearing shear ball assembly 25). Due to their ability to restrain overturning moments and shear and tensile forces as shall be illustrated with respect to FIGS. 3A and 3B, the shear ball 20 and the collar 45 are respectively referred to herein as a moment bearing shear ball 20 and a moment collar 45 and collectively referred to as the moment bearing shear ball assembly 25. Accordingly, the moment bearing shear ball assembly 25 of the various embodiments described herein thus advantageously holds or couples the deployable device 15 to the rest of the spacecraft 101 while restraining motion in 5 of the 6 degrees of freedom.

Figure 3A:
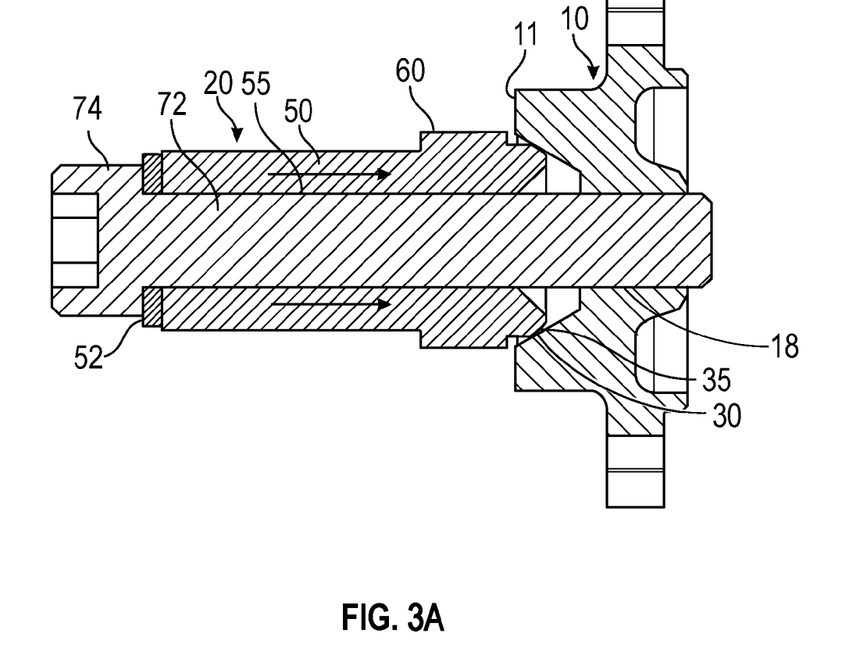
FIGS. 3A and 3B are cross-sectional views of the launch-lock components of the spacecraft deployment systems illustrated in FIGS. 2A and 2B during assembly, according to various embodiments of the present disclosure.
Figure 3B:
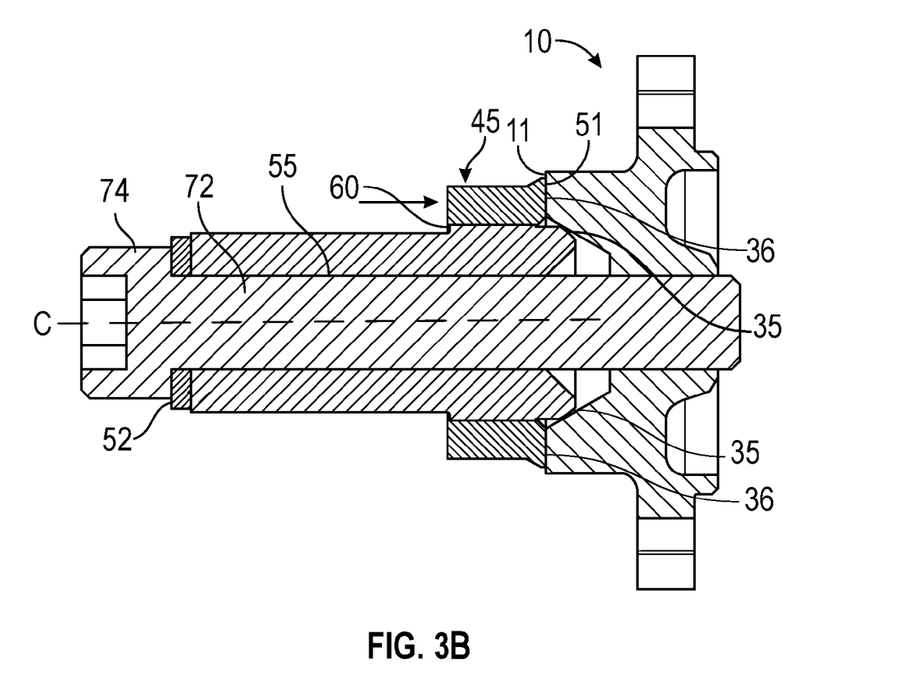

FIGS. 3A and 3B are cross-sectional views of the launch-lock components of the spacecraft deployment systems illustrated in FIGS. 2A-2D during assembly, according to various embodiments of the present disclosure. Referring to FIGS. 3A and 3B, with continued reference to FIG. 1, as previously discussed the spacecraft deployment system 100 may include the command and release mechanism in the form of the mechanical actuator 40 and a controller coupled to the shear ball assembly 25 through the notched fastener, e.g. notched bolt 70. As depicted in FIG. 1, the notched bolt 70 may be a part of the command and release mechanism and extend all the way through the shear ball assembly 25 and the fitting 10 so as to couple all of the aforementioned elements along a longitudinal axis thereof.

In particular, prior to deployment of the deployable device 15, the notched bolt 70 may couple the shear ball assembly 25 and the fitting 10 to each other along the separation interface 35, 36. In accordance with various embodiments of the present disclosure, portion 35 of the separation interface may be defined between the spherical ball 30 and the conical profile 12 of mating surface 13 of the fitting 10, and portion 36 of the separation interface may be defined between the respective mating surfaces 11 and 51 of the fitting 10 and the moment collar 45.

Engagement of the outer circumferential surface 33 of the spherical ball 30 within the conical profile 12 of the inner mating surface 13 constrains shear forces in at least two axes at the separation interface 35, 36. In particular, due to the nature of the conical shape of the mating surface 13, when inserted therein, motion of the spherical ball 30 (and the rest of the shear ball 20) is constrained in at least two perpendicular axes, for example, the vertical and horizontal axes. Accordingly, motion of the spherical ball 30 is limited to rotation about a central longitudinal axis C of the shear ball 20. Engagement of the planar mating surface 51 of the moment collar 45 with the planar outer mating surface 11 of the fitting constrains axial moments of the moment bearing shear ball about at least a third axis at the separation interface 35, 36. As depicted in FIG. 3B, the third axis is the central longitudinal axis C of the shear ball 20. Accordingly, the shear ball 20 is restrained from rotating about all axes but the central axis C and any colinear axes. As such, when the spacecraft deployment system 100 is subject to induced loads during preload, vibe, or launch, the aforementioned engagement of the shear ball 20, the moment collar 45, and the fitting 10 at the separation interface 35, 36 prevents the deployable device from being prematurely deployed from the spacecraft 101. The moment bearing shear ball assembly 25 of the various embodiments described herein thus advantageously holds or couples the deployable device 15 to the remainder of the spacecraft 101 while restraining motion in 5 of the 6 degrees of freedom until a command is received from the spacecraft controller to activate the actuator, thereby shearing the bolt 70 and releasing the deployable device 15 from the spacecraft 101.

Figure 4A:
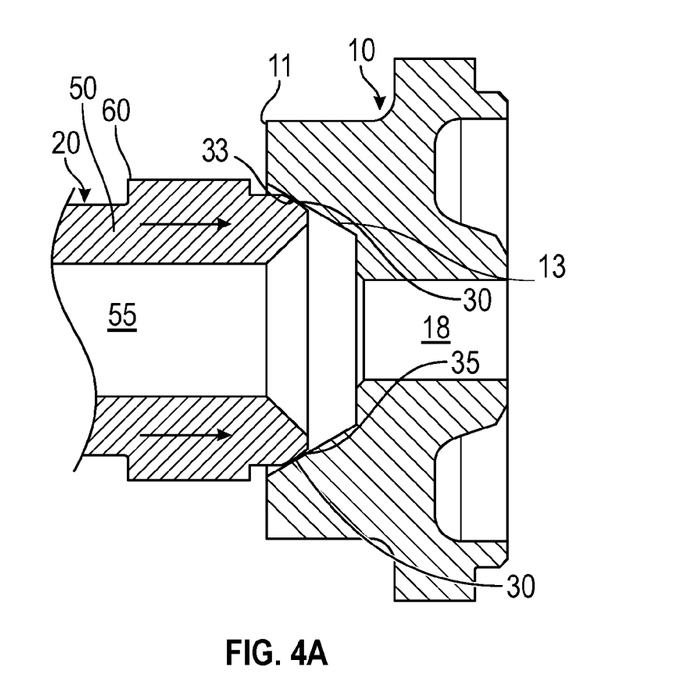
FIG. 4A is a partial cross-sectional illustration of the shear ball mated to the deployment device fitting of the spacecraft deployment system of FIG. 1 during assembly of the moment bearing shear ball assembly, according to various embodiments of the present disclosure.
Figure 4B:
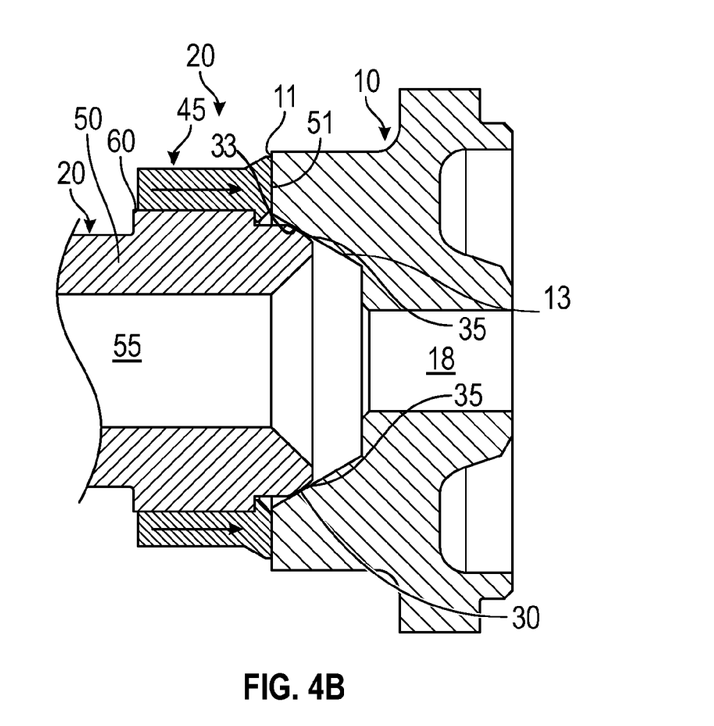
FIG. 4B is a partial cross-sectional illustration of assembly of the shear ball with moment collar mated to the deployment device fitting of the spacecraft deployment system of FIG. 1 during assembly of the moment bearing shear ball assembly, according to various embodiments of the present disclosure.

FIG. 4A is a partial cross-sectional illustration of assembly of the shear ball 20 and the deployment device fitting 10 of the spacecraft deployment system 100 of FIG. 1, according to various embodiments of the present disclosure. FIG. 4B is a partial cross-sectional illustration of assembly of the moment collar 45 to the assembled shear ball 20 and deployment device fitting 10 of the spacecraft deployment system 100 of FIG. 1, according to various embodiments of the present disclosure.

Various embodiments of the present disclosure are directed to providing methods of assembling the aforementioned moment bearing spacecraft deployment system 100 for a small-scale spacecraft (e.g., a nano-satellite up to 100 kg). In order to assemble the moment bearing shear ball assembly 25, the spherical ball 30 is first mated with the fitting 10, as illustrated in FIG. 4A. In particular, the spherical ball 30 may be aligned and inserted into the conical profile 12 of the inner mating surface 13 of the deployable device fitting 10. The spherical ball 30 and the conical-shaped bore 12 as mated and assembled form a ball and socket joint. As assembled, the spherical ball 30 and the conical-shaped bore 12 ball and socket locks out the tensile and shear forces in three axes, thereby preventing motion at the separation interface 35, 36 in the up-down and in-out directions (shear) and the left-right direction (axial) as oriented in FIG. 4A.

As depicted in FIGS. 4A and 4B, with continued reference to FIGS. 3A and 3B, during assembly of the moment bearing shear ball assembly 25, the shear ball 20 may first be preloaded against the fitting 10 such that the outer circumferential surface 33 of the moment bearing shear ball contacts the inner mating surface 13 of the fitting 10. The preload may be provided by an alignment fastener, e.g., alignment bolt 72 (illustrated in FIGS. 3A and 3B) passing through the bore 55 of the shear ball 20 and the bore 18 of the fitting 10. In some embodiments, bore 18 may be threaded such that the alignment bolt 72 may be inserted at the distal end 52 of the shear ball 20 through the bore 55 and threaded into the bore 18. In this embodiment, when the alignment bolt 72 is tightened, the head 74 of the alignment bolt 72 seats against the distal end 52 of the shear ball 20 and exerts a compressive load between the shear ball 20 and fitting 10. In some embodiments using the alignment bolt 72, the alignment bolt 72 may have a precision shoulder with a diameter closely matching that of bore 55 such that the shear ball 20 is more closely held in an orientation in which bore 55 is collinear with bore 18 of the fitting 10.

Next, the moment collar 45 is slid over the cylindrical body 50 of the shear ball 20 and engaged onto the raised seating portion 60 of the shear ball 20. By engaging the seating portion 60 of the shear ball 20, the moment collar 45 prevents rotation of the shear ball 20 about all but the third axis (i.e., the axis extending through an axial center of the shear ball 20). In some embodiments, the moment collar 45 may be further securely engaged with the shear ball 20 by forming the raised seating portion 60 with complementary threads on an outer surface thereof to engage with the threads 46 disposed on the inner circumferential surface 47 (illustrated in FIG. 2A) of the moment collar 45. Additionally, or alternatively, the inner circumferential surface 47 and raised seating portion 60 may be securely engaged with each other through use of at least one of an adhesive, pinning, welding, use of lock wire, or any other suitable bonding or attachment method.

Accordingly, the moment bearing shear ball assembly 25 of the various embodiments described herein holds the deployable device 15 to the spacecraft 101 in such a manner that the loads (tensile and shear forces, and axial moments) are adequately reacted at the separation interface 35, 36, thereby reducing the possibility of premature fracturing of the bolt 70 and deployment of the deployable device 15 during preload, vibe, or launch of the spacecraft 101. As such, the moment bearing shear ball assembly 25 of the various embodiments described herein thus advantageously holds or couples the deployable device 15 to the rest of the spacecraft 101 while restraining motion in 5 of the 6 degrees of freedom.

In contrast, various issues are presented by release mechanisms applied at separation interfaces of the currently existing or conventional spacecraft deployment systems. For example, due to the manner in which currently existing spacecraft deployment system separable interfaces are formed and machined, they can only restrain three of the six degrees of freedom (DoF). This allows for unconstrained loads to be exerted at the separation interface between the deployable device and the spacecraft to which it is attached. As a result, various solutions have been applied to deployment system separable interfaces in an attempt to increase the number of degrees of freedom restrained. For example, commonly, ball-cones are used at separation interfaces, including, but not limited to (1) common shear-tie arrays which involve providing three or more separation interfaces, each having a corresponding ball-cone joint, (2) three-ball cone arrays which involve a single separation interface employing three separate ball-cone arrays, and (3) tri-balls which involve a plurality of miniaturized ball-cone arrays. In some instances, flat-flat cup-cones, which are friction shear reliant are used at separation interfaces. However, the aforementioned existing solutions associated with separation interfaces of the currently existing spacecraft deployment systems often involve added complexity which cascades into various secondary effects such as: (1) need for additional firing harnesses based on the additional number of separation interfaces and/or ball-cone arrays, (2) additional secondary structure to support the additional separation interfaces and/or ball-cone arrays, (3) additional alignment requirements associated with the additional separation interfaces, (4) additional sequencing requirements associated with the additional separation interfaces, (5) increased quantity of parts, and (5) ultimately larger size assemblies to support the additional parts involved. All of these add to higher cost, greater mass, added risk, and longer lead times.

Contrary to the existing solutions applied to current deployment device separation interfaces, the moment bearing shear ball assembly of the various embodiments described herein does not involve such added complexity, mass, and cost. The moment bearing shear ball assembly of the various embodiments described herein provides enhanced moment bearing properties as compared with the currently existing solutions discussed above. For example, as described above, the moment bearing shear ball assembly of the various embodiments described herein improves the number of degrees of freedom restrained from 3 to 5 degrees of freedom at a single separation interface. The restraint of five degrees of freedom is applied at two load sharing contact regions - i.e., (1) the region where the spherical ball 30 contacts the conical surface 12 of the bore of the fitting 10 (translation (2+1 DoF)), and (2) the region where the raised seating surface 60 of the shear ball 30 makes flat contact with the threaded inner circumferential surface 47 of the moment collar 45 (overturning moments (2+1 DoF).

Accordingly, the moment bearing shear ball assembly and separation interface of the various embodiments described herein is advantageous over release mechanisms applied at separation interfaces of the currently existing or conventional deployment systems. The moment bearing shear ball assembly and separation interface described herein provides a precision matched interface that is capable of resisting shear, axial forces, and overturning moments. Further, the moment bearing shear ball assembly and separation interface is easy to manufacture/machine, thereby providing repeatable alignment exceeding that achievable through conventionally machined parts applied at separation interfaces of the currently existing or conventional deployment systems. In particular, the moment bearing shear ball assembly and separation interface provide the following advantages: (1) five (5) DoF restraint as compared to the conventional three (3) DoF restraint, (2) controlled load paths through the separation interface, (3) assembly level alignment allows control of load sharing, (4) versatility: the ability to convert to/from 3 to 5 DoF by design; (4) easily retrofits to existing heritage designs, (5) reduction in restraint count allows smaller scale use, and (6) simple self-centering manufacturing and assembly processes, which allow one side of the interface to be assembled to match the other. The operation and its verification are simple and require no specialized equipment or tooling, and the design increases fidelity of stress analysis to improve performance and margins. Potential cost savings are significant during assembly, testing (Vibe, Static) and flight by prevention of failure at separation device due to extraneous loads.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the terms include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure.

What is claimed is:

1. A deployment system for a spacecraft, the deployment system comprising:
    a fitting for coupling a deployable device to the spacecraft, the fitting comprising an inner mating surface and a planar outer mating surface;
    a moment bearing shear ball assembly including:
        a shear ball having an outer circumferential mating surface engaged within the inner mating surface of the fitting; and
        a moment collar mounted onto the shear ball, the moment collar comprising a planar mating surface engaged with the planar outer mating surface of the fitting; and
    a separation interface defined between at least one of (1) the mating surfaces of the fitting and the shear ball and (2) the mating surfaces of the fitting and the moment collar,
        wherein engagement of the outer circumferential surface of the shear ball within the inner mating surface of the fitting constrains translation shear forces in at least two axes and axial forces in at least a third axis at the separation interface, and
        wherein engagement of the planar mating surface of the moment collar with the shear ball and the planar outer mating surface of the fitting constrains overturning moments of the shear ball about the at least two axes and axial forces in at least the third axis at the separation interface.

2. The deployment system of claim 1, further comprising:
    a command and release mechanism coupling the shear ball assembly and the fitting at the separation interface; and
    a spacecraft controller configured to send a command to control operation of the command and release mechanism.

3. The deployment system of claim 2, wherein the shear ball comprises:
    an elongate cylindrical body having a proximal end portion and a distal end portion, wherein the outer circumferential surface is positioned at the distal end portion of the shear ball; and
    a bore extending axially through the elongate cylindrical body.

4. The deployment system of claim 3, wherein the shear ball assembly further comprises a raised seating portion extending concentrically from an outer surface of the distal end portion of the elongate cylindrical body.

5. The deployment system of claim 4, wherein the moment collar further comprises a cylindrical body configured to fit around and engage the outer surface of the elongate cylindrical body of shear ball at the raised seating portion.

6. The deployment system of claim 5, wherein the moment collar includes a plurality of threads disposed on an inner circumferential surface thereof to engage an outer surface of the raised seating portion.

7. The deployment system of claim 3, wherein:
    the inner mating surface of the fitting has a conical profile; and
    the outer circumferential surface of the shear ball comprises a spherical outer surface engaging the conical profile of the inner surface at the separation interface to form a ball-and-socket joint which prevents motion due to shear forces at the separation interface in the at least two axes.

8. The deployment system of claim 7, wherein the fitting further comprises:
    a proximal end portion from which the inner mating surface extends; a distal end portion including a plurality of anchoring legs to anchor the fitting to the deployable device; and a bore extending axially through the fitting from the proximal to the distal end portion.

9. The deployment system of claim 8, wherein the command and release mechanism comprises an actuator configured to releasably couple the moment bearing shear ball assembly to the fitting and release a preload between the shear ball and the fitting to separate the deployable device from the spacecraft.

10. The deployment system of claim 9, wherein the actuator is a shape memory alloy release actuator, a Split-Spool Release Device, or a pyrotechnic release actuator.

11. A method of assembling a moment bearing deployment system for a spacecraft including a moment bearing shear ball assembly including a shear ball having a cylindrical body, a moment collar, and a fitting for a deployable device of the spacecraft, wherein a separation interface is defined between mating surfaces of the shear ball and the fitting, and the moment collar and the fitting, the method comprising:
 preloading the shear ball against the fitting to prevent motion of the shear ball in at least two axes at the separation interface;
 sliding the moment collar over the shear ball and engaging an outer surface of the shear ball with an inner surface of the moment collar; and
 engaging a planar surface of the moment collar with a corresponding planar surface of the fitting,
 wherein the engaging of the moment collar with the outer surface of the shear ball and the planar surface of the fitting prevents rotation of the shear ball about a third axis.

12. The method of claim 11, wherein the preloading the shear ball against the fitting comprises mating an outer circumferential surface of the shear ball with an inner mating surface of the fitting to form a ball-and-socket joint at the separation interface.

13. The method of claim 12, wherein mating the outer circumferential surface of the shear ball with the inner mating surface of the fitting comprises inserting an alignment fastener through a bore of the shear ball and a bore of the fitting to engage and couple the shear ball and the fitting.

14. The method of claim 13, further comprising tightening the alignment fastener so a head of the alignment fastener seats against a distal end of the shear ball and exerts a compressive load between the shear ball and the fitting to provide a predetermined preload.

15. The method of claim 13, wherein:
 the shear ball comprises a spherical ball disposed at a distal end of the cylindrical body, and the inner surface of the fitting has a conical profile; and
 the mating the outer circumferential surface of the shear ball with the inner mating surface of the fitting comprises aligning the bore of the shear ball with the bore of the fitting and inserting the spherical ball of the shear ball into the conical profile of the inner surface of the fitting to form the ball and socket joint.

16. The method of claim 15, wherein:
 the cylindrical body comprises a raised seating portion extending concentrically from an outer surface of a distal end portion of the cylindrical body; and
 the engaging the outer surface of the cylindrical body with the moment collar comprises engaging the moment collar over the raised seating portion.

17. The method of claim 16, wherein the moment bearing deployment system further includes a command and release mechanism including, an actuator, a notched fastener, and a spacecraft controller configured to send a command to control operation of the command and release mechanism, the method further comprising:
 coupling the command and release mechanism to the shear ball and the fitting by inserting the notched fastener though aligned bores of the command and release mechanism, the shear ball, and the fitting.

18. The method of claim 17, wherein the actuator comprises a sleeve mounted over the notched fastener.

19. The method of claim 18, wherein the sleeve comprises a shape memory alloy material configured to extend in length and correspondingly extend the elongate body of the fastener upon receipt of a control signal from the spacecraft controller.

20. The method of claim 19, wherein the shape memory alloy material extends in length due to an increase in temperature prompted by the spacecraft controller, and causes the notched fastener to fail and fracture at the separation interface, thereby separating the moment bearing shear ball assembly from the deployable device fitting at the separation interface.

* * * * *